3,639,547
METHOD FOR PREPARING O-METHYL-S-METHYL PHOSPHOROAMIDOTHIOATE

Philip S. Magee, San Rafael, Calif., assignor to Chevron Research Company, San Francisco, Calif.
No Drawing. Continuation-in-part of application Ser. No. 468,986, July 1, 1965. This application Jan. 21, 1969, Ser. No. 792,785
Int. Cl. C07f 9/24; A01n 9/36
U.S. Cl. 260—989                                    14 Claims

ABSTRACT OF THE DISCLOSURE

Stable O-methyl-S-methylphosphoroamidothioate, useful as an insecticide, is prepared by ammoniating O,O-dimethylhalophosphorothioate with aqueous ammonia to form O,O-dimethylphosphoroamidothionate and reacting the O,O-dimethylphosphoroamidothionate with dimethyl sulfate or a methyl sulfonate at about 20 to 100° C.

CROSS REFERENCE TO RELATED APPLICATIONS

This application is a continuation-in-part of copending application Ser. No. 468,986, filed July 1, 1965.

FIELD OF INVENTION

This invention is directed to an improved process for preparing O-methyl-S-methylphosphoroamidothioate. More specifically, it concerns a process for preparing O-methyl-S-methylphosphoroamidothioate by reacting O,O-dimethylphosphoroamidothionate with methyl esters of sulfuric acid or metyl esters of sulfonic acids.

BACKGROUND OF INVENTION

O-methyl-S-methylphosphoroamidothioate is an excellent insecticide. It exhibits both systemic and contact insecticidal activity against a variety of insects. It is particularly effective against cabbage looper. It has also been found to be unexpectedly more insecticidal than its isomer, O,O-dimethylphosphoroamidothionate and its O- and S-alkyl homologs.

The Journal of the Chemical Society, pp. 5532–5564 (1961) describes a process for preparing O-ethyl-S-alkyl-phosphoroamidothioates by reacting O,O-diethylphosphoroamidothionate with an alkyl iodide. Copending application Ser. No. 468,986 teaches that this general reaction scheme may be extrapolated and used to make O-methyl - S - methylphosphoroamidothioate by reacting O,O - dimethylphosphoroamidothionate with methyl iodide. Since the empirical formulas of the phosphoroamidothionate reactant and phosphoroamidothioate product are identical, this reaction may be considered an isomerization; however, it is believed that the reaction mechanism involves methylation.

Unfortunately, it was found that the crude O-methyl-S-methylphosphoroamidothioate made using methyl iodide in the above manner was significantly unstable. It was further found that this instability could not be avoided by simple purification techniques. Exhaustive purification was found to produce a more stable material but such purification would be prohibitively expensive on a commercial level. This instability problem makes the methyl iodide reaction described above impractical for manufacturing O - methyl - S - methylphosphoroamidothioate on a commercial scale.

INVENTION DESCRIPTION

According to this invention it has been found that very stable, crude O-methyl-S-methylphosphoroamidothioate may be prepared by reacting O,O-dimethylphosphoroamidothionate with the dimethyl ester of sulfuric acid or with methyl esters of organic sulfonic acids at 20–100° C. While dimethyl sulfate and methyl sulfonates appear to function like methyl iodide in the reaction, i.e., as methylating agents, they, in surprising contrast, produce a crude product having excellent shelf stability. This unexpected result is postulated to be due to the fact that the methyl iodide reaction makes minor amounts of by-products which catalyze the chemical degradation of O-methyl-S-methylphosphoroamidothioate. The dimethyl sulfate and methyl sulfonate reactions do not yield by-products having this adverse effect on O-methyl-S-methylphosphoroamidothioate. It is within the scope of this invention to use mixtures of dimethyl sulfate and methyl sulfonates to prepare O-methyl-S-methylphosphoroamidothioate.

The above described reaction using dimethyl sulfate or methyl sulfonates may be integrated with the ammoniation used to make O,O-dimethylphosphoroamidothionate. Accordingly, O,O-dimethylhalophosphorothioate in which the halogen is of atomic number 17 to 35, i.e., chlorine or bromine, is ammoniated to form O,O-dimethylphosphoroamidothionate and the O,O-dimethylphosphoroamidothionate is then reacted with dimethyl sulfate or with a methyl sulfonate as described above.

The methyl esters of organic sulfonic acids which may be used in this invention normally will be methyl alkanesulfonates wherein the alkane moiety is of 1 to about 6 carbon atoms or a methyl carbocyclicarylsulfonate in which the carbocyclicaryl group is of 6 to 10 carbon atoms. The carbocyclicaryl group will usually be monocarbocyclicaryl of 6 to 8 carbon atoms. This aryl group may be substituted nuclearly with one or more groups such as chlorine, bromine, lower alkoxy (1 to 4 carbon atoms) and the like which do not affect the methylation-isomerization reaction materially. Such esters include methyl methanesulfonate, methyl ethanesulfonate, methyl propanesulfonate, methyl hexanesulfonate, methyl benzenesulfonate, methyl toluenesulfonate, methyl xylenesulfonate, methyl naphthylsulfonate, methyl p-chlorophenylsulfonate, methyl o-chlorophenylsulfonate, methyl m-bromophenylsulfonate, methyl p-bromophenylsulfonate and methyl chloronaphthylsulfonate. Methyl toluenesulfonate and methyl methanesulfonate are preferred because of their availability.

The quantity of dimethyl sulfate, sulfonate or mixtures thereof which is used is very important economically. Theoretically, up to a molar amount of these materials may be used in the methylation. However, for practical reasons the amounts used in commercial operations will normally be about 1 to 10 mol percent, based on the total reaction mixture. The desirable range for a particular material may vary within this range. For instance, amounts of dimethyl sulfate greater than about 6 mol percent increase the production of by-products which do not enhance O-methyl-S-methylphosphoroamidothioate degradation but do decrease the product yield. When dimethyl sulfate is employed amounts in the range of about 3 to 5 mol percent give good yields of the desired product and 4 mol percent appears to be an optimum quantity when used in conjunction with optimum reaction conditions. With the sulfonates, e.g., methyl toluenesulfonate, somewhat greater amounts, i.e., about 3 to 8 mol percent, are preferred.

The reaction is exothermic and its rate depends on the temperature at which it is carried out. At operating temperatures ranging between 20–80° C. using the optimum quantity of dimethyl sulfate as the methylating agent, maximum yields of product are achieved in about 1–2 days at 20° C. and several minutes at 80° C. Temperatures below 20° C. may be used. However, they will require long reaction times which are impractical for commercial operation. With dimethyl sulfate the reaction is difficult to control at temperatures above 80° C. because of its exothermicity. A temperature range which gives a reasonable, controllable reaction rate is 40–80° C. The above described temperatures are operating temperatures and the actual reaction temperature, because of the heat generated by the reaction, may be substantially higher than the operating temperature. When methyl sulfonates are used the operating temperature will range between about 20 to 100° C., preferably 50–80° C.

The pressure used in the isomerization-methylation is not critical. Atmospheric or autogenous pressures are preferred because of convenience.

As described above the O,O-dimethylphosphoroamidothionate reactant in the isomerization-methylation is prepared by ammoniating O,O-dimethylhalophosphorothioate. Preferably, O,O - dimethylchlorophosphorothioate (DMPCT) is used. The reaction is exothermic and produces ammonium chloride proportionately to the phosphoroamidothionate. One method for effecting such ammoniation is to pass gaseous ammonia into a solution of the chlorophosphorothioate in an aromatic solvent such as benzene, toluene or xylene. This procedure is suitable for small scale preparations. However, on a large scale it is difficult to handle the solid ammonium chloride formed in the reaction medium and the large amounts of heat evolved. These difficulties may be overcome by ammoniating with an aqueous solution of ammonia at concentrations and amounts which will dissolve essentially all the solid ammonium chloride formed. Using an aqueous solution of ammonia instead of gaseous ammonia also facilitates temperature control, reduces reaction time and makes smaller reactor volumes possible.

The aqueous ammonia is added to stirred DMPCT either neat (no solvent) or in a methylene chloride solution at about 10–80° C., preferably 20–40° C. To keep the temperature controlled within this range it may be necessary to remove heat from the reaction by external or internal cooling means or by refluxing.

The pressure used in the ammoniation is not critical. For convenience it will usually be atmospheric or autogenous.

If the DMPCT is used neat, methylene chloride or an aromatic solvent such as benzene, toluene or xylene is added to the reaction product to extract the phosphoroamidothionate therefrom. The aqueous phase is then separated from the organic phase. The solvent is removed from the organic phase under vacuum leaving crude O,O-dimethylphosphoroamidothionate. This product may be directly charged to the isomerization-methylation.

If methylene chloride is used to dilute the DMPCT, the solution's concentration, based on methylene chloride will be about 35 to 55% by weight. With such solutions, the methylene chloride phase is merely separated after the reaction is complete. The methylene chloride is then removed as above leaving the crude product.

The concentration of the aqueous ammonia and the mol ratio of ammonia to DMPCT are such that sufficient water is present in the reaction mixture to dissolve essentially all the ammonium chloride produced. When commercial aqueous ammonia (28% ammonia) is used, the ammonia:DMPCT mol ratio will be greater than about 3:1 and usually between 3:1 and 5:1. Mol ratios lower than 3:1 under these conditions will require water addition to prevent solid ammonium chloride from precipitating.

The above described ammoniation is adaptable to either batch or continuous operation. In a batch process the rate of addition of aqueous ammonia to stirred DMPCT will depend upon the efficiency of heat removal from the system. At high efficiencies the aqueous ammonia may be added rapidly. Low heat removal rates necessitate slower addition. Using comparable equipment and reactant quantities, ammoniation by gaseous ammonia requires from 2 to 4 times longer to complete than does ammoniation by aqueous ammonia. When aqueous ammonia is used reaction times are usually with the range of 5 minutes to 3 hours in duration.

EXAMPLES

The following examples illustrate the methylation-isomerization of this invention and the ammoniation using aqueous ammonia. These examples are not intended to limit, in any manner, the invention described and claimed herein. Unless indicated otherwise, percentages are by weight.

Example 1

(a) Preperation of O,O-dimethyl phosphoroamidothioate using aqueous ammonia.—A 5 liter, 3-necked round bottom flask equipped with a stirrer, condenser, thermometer and dropping funnel was charged with 1 liter of methylene chloride and 800 g. (5 mols) of O,O-dimethylchlorophosphorothioate. This solution was cooled in an ice bath, and 1000 ml. of concentrated ammonium hydroxide was added slowly over a period of 35 minutes. The temperature rose to 44° C. (gentle reflux) during this time and then dropped to 21° C. at the end of the reaction. The ice bath was removed, and the reaction mixture was stirred for an additional 35 minutes. Then 100 ml. of water was added and two phases formed. The organic phase was separated from the aqueous phase. The latter was discarded; the former was filtered, and then evaporated to give 690 g. of a colorless oil. Analysis by chromatography showed this to be 96.3% pure O,O-dimethylphosphoroamidothioate.

(b) Preparation of O - methyl - S - methylphosphoroamidothioate using dimethyl sulfate.—An apparatus consisting of a water-jacketed 250 ml. reactor containing an internal cooling coil, thermometer and stirring means was charged with 50 g. (0.35 mol) of the O,O-dimethylphosphoroamidothioate of Example 1(a) and 2 g. of dimethyl sulfate. The resulting solution was heated to 50° C. by passing hot (50° C.) water through the reactor jacket. The reaction temperature was maintained at 50° C. by passing cold water through the internal cooling coil. Reaction was continued at this temperature for 1½ hours. Then the temperature was raised gradually to 63° C. over a period of two hours. At the end of this time, the crude reaction mixture was cooled to room temperature and analyzed by gas-liquid chromatography. The crude product contained 74.6% O-methyl-S-methylphosphoroamidothioate, 12.8% starting material and 12.6% unknown by-products.

(c) Purification of crude O-methyl-S-methylphosphoroamidothioate.—The entire crude mixture was then dissolved in 150 ml. water and extracted with two 80 ml. portions of methylene chloride. The extracts were discarded. To the aqueous phase there was added 80 g. of ammonium sulfate. This aqueous phase was reextracted with five 100 ml. portions of methylene chloride. Evaporation of the solvent gave 35 g. (70%) of essentially pure O - methyl - S - methylphosphoroamidothioate. This material was a low melting solid (39–40° C.). Analysis by NMR showed the typical doublet adsorptions at 2.27 p.p.m. and 3.74 p.p.m. (referred to tetramethyl silane). Further purification by extraction from an aqueous potassium carbonate solution with methylene chloride followed by evaporation and drying gives the pure compound, M.P. 43° C.

Example 2

Preparation of O - methyl - S - methylphosphoroamidothioate using methyl p-toluenesulfonate.—In the same apparatus as described in Example 1(b), there was charged 100 g. (0.709 mol) of O,O-dimethylphosphoroamidothioate and 6.0 g. of methyl p-toluene sulfonate. The solution was heated to 70° C. and held at this temperature for 2½ hours. At the end of this time, the crude product was analyzed as before, and found to contain 71.8% O - methyl - S - methylphosphoroamidothioate, 17.1% starting material and 11.1% by-product. The crude reaction mixture was clear and unclouded.

Example 3

Preparation of O-methyl-S-methylphosphoroamidothioate using methyl methanesulfonate.—In the same apparatus as described in Example 1(b), there was charged 50 g. O,O-dimethylphosphoroamidothionate and 6.0 g. methyl methane sulfonate. The solution was heated to 50° C. and held at this temperature for 2 hours. At the end of this time the crude product was analyzed as before and found to contain 31.8% O-methyl-S-methylphosphoroamidothioate, 66% starting material and 2.2% by-product.

Example 4

Effect of temperature on reaction of dimethyl sulfate with O,O-dimethylphosphoroamidothionate.—A series of experiments were carried out as described in Example 1(b), except that the temperature of the reaction was held at a different value in each run. Samples were removed periodically and analyzed for product and starting material. The results are given in Table I.

TABLE I.—EFFECT OF TEMPERATURE ON PREPARATION OF O-METHYL-S-METHYLPHOSPHOROAMIDOTHIOATE

| Example No. | Temp., °C. | Time | Product conc. (percent) | Starting material conc. (percent) |
|---|---|---|---|---|
| 4a | 20-25 | 2 days | 83.0 | 5.6 |
| 4b | 35 | 4½ hrs | 74.0 | 18.6 |
| 4c | 50 | 2½ hrs | 76.4 | 12.7 |
| 4d | 60 | 2 hours | 77.5 | 10.6 |
| 4e | 70 | 1 hour | 75.5 | 10.7 |
| 4f | 80 | do | 66.2 | 15.5 |
| 4g | >90 | Violently exothermic | | |

Example 5

Effect of dimethyl sulfate concentration on preparation of O-methyl-S-methylphosphoroamidothioate.—Example 1(b) was repeated, except that the quantity of dimethyl sulfate was varied and the reaction time was 2 hours at 50° C. The results are given in Table II.

TABLE II.—EFFECT OF DIMETHYL SULFATE CONCENTRATION OF PREPARATION O-METHYL-S-METHYL-PHOSPHOROAMIDOTHIOATE

| Example No. | Dimethyl sulfate conc., wt. percent | Reaction mixture Percent product | Percent starting material |
|---|---|---|---|
| 5a | 1 | 46.5 | 50.7 |
| 5b | 2 | 61.2 | 29.5 |
| 5c | 3 | 66.2 | 25.2 |
| 5d | 4 | 73.8 | 15.0 |
| 5e | 5 | 74.4 | 9.2 |
| 5f | 6 | 78.5 | 5.1 |
| 5g | 9 | 73.0 | |

The results reported in Table II show that the product yield peaks in the 4-6% dimethyl sulfate range under typical reaction conditions.

Example 6

Thermal stability of O-methyl-S-methylphosphoroamidothioate.—Samples of O-methyl-S-methylphosphoroamidothioate made by various processes and purified to different levels of purification were tested for thermal stability at 100° F. (37° C.). Both concentrated solutions of the test materials and undiluted solid samples were examined. The tests on solid samples were carried out by placing the sample in a closed jar at the test temperature. Aliquots were removed periodically and analyzed by gas-liquid chromatography. The results are given in Table III.

The thermal stabilities of concentrated liquid solutions of the test compounds were determined on samples prepared by diluting 96 g. of the material to 100 ml. with ethylene glycol. The resulting solution was stored at 100° F. (37° C.). Small aliquots were removed periodically and analyzed by gas-liquid chromatography. The results are also given in Table III.

TABLE III.—THERMAL STABILITY OF O-METHYL-S-METHYLPHOSPHOROAMIDOTHIOATE AT 100 F.

[Test material]

| Ex. No. | Preparative method and purification procedure | Concentration, percent Initially | Months on test ½ | 1 | 3 |
|---|---|---|---|---|---|
| | Undiluted: | | | | |
| 6a | By procedure of Ex. 1(b) | 80.0 | | 77.8 | 75.8 |
| 6b | By procedure of Ex. 1(c) | 100 | 100 | | 98.6 |
| 6c | By methyl iodide procedure of U.S. Patent 3,309,266, Ex. 1, purified by a single aqueous wash. | 91.4 | 86.2 | | Gel [1] |
| | Concentrated solutions: | | | | |
| 6d | By procedure of Ex. 1(b) | 72.3 | 70.4 | | 70.1 |
| 6e | By methyl iodide procedure of U.S. Patent 3,309,266, Ex. 1, purified by a single aqueous wash. | 77.0 | | | 56.4 |

[1] Material turned solid at the test temperature.

Experience indicates that three months at 100° F. is equivalent to one year at ambient temperature conditions for many compounds. On this basis, crude O-methyl-S-methylphosphoroamidothioate prepared by the process of the present invention has a shelf life expectancy of over one year.

The data of Table III show that O-methyl-S-methylphosphoroamidothioate prepared by the process of this invention and without any purification (Examples 6a, 6b, 6d) is quite stable and only suffers a 2 to 4% loss over the test period. On the other hand, the same compound prepared by the methyl iodide method and purified by an aqueous wash (Examples 6c and 6e) was unstable and suffered a 14 or greater percent loss over the test period. The material prepared by the methyl iodide process has a higher initial purity than that prepared by the invention process. In spite of this greater purity, the methyl iodide-prepared product is substantially less stable than the product prepared in accordance with the present process.

I claim:

1. Process for preparing O-methyl-S-methylphosphoroamidothioate which comprises reacting O,O-dimethylphosphoroamidothionate with dimethyl sulfate or a methyl ester of an organic alkyl or carbocyclic aryl sulfonic acid in which the alkyl group is of 1 to 6 carbon atoms and the carbocyclicaryl group is of 6 to 10 carbon atoms at about 20–100° C.

2. Process of claim 1 wherein said methyl ester of an organic sulfonic acid is a methyl alkanesulfonate in which the alkane moiety is of 1 to 6 carbon atoms or a methyl monocarbocyclicarylsulfonate in which the monocarbocyclicaryl group is of 6 to 8 carbon atoms.

3. Process of claim 1 wherein said methyl ester of an organic sulfonic acid is methyl methanesulfonate or methyl toluenesulfonate.

4. Process of claim 1 wherein the dimethyl sulfate or the methyl ester of an organic sulfonic acid comprises about 1 to 10 mol percent of the reaction mixture.

5. Process for preparing O-methyl-S-methylphosphoroamidothioate which comprises reacting O,O-dimethylphosphoroamidothionate with dimethyl sulfate at 20 to 80° C.

6. Process of claim 5 wherein the dimethyl sulfate comprises about 1 to 6 mol percent of the reaction mixture.

7. Process of claim 5 wherein the reaction temperature is about 40 to 80° C. and the dimethylsulfate comprises about 3 to 5 mol percent of the reaction mixture.

8. Process for preparing O-methyl-S-methylphosphoroamidothioate which comprises reacting O,O-dimethylphosphoroamidothionate with methyl toluenesulfonate or methyl methanesulfonate at 20 to 100° C., said methyl toluenesulfonate or methyl methanesulfonate comprising about 3 to 8 mol percent of the reaction mixture.

9. Process of claim 8 wherein the reaction temperature is about 50 to 80° C.

10. Process for preparing O-methyl-S-methylphosphoroamidothioate which comprises ammoniating O,O-dimethylhalophosphorothioate wherein the halogen is of atomic number 17 to 35 with ammonia at about 10 to 80° C. to form O,O-dimethylphosphoroamidothionate, recovering said O,O-dimethylphosphoroamidothionate and reacting said O,O-dimethylphosphoroamidothionate with dimethylsulfate or a methyl ester of an organic alkyl or carbocyclicaryl sulfonic acid in which the alkyl group is of 1 to 6 carbon atoms and the carbocyclicaryl group is of 6 to 10 carbon atoms at about 20 to 100° C.

11. Process of claim 10 wherein said methyl ester of an organic sulfonic acid is a methyl alkanesulfonate in which the alkane moiety is of 1 to 6 carbon atoms or a methyl monocarbocyclicarylsulfonate in which the monocarbocyclicaryl group is of 6 to 10 carbon atoms.

12. Process of claim 10 wherein said methyl ester of an organic sulfonic acid is methyl methanesulfonate or methyl toluenesulfonate.

13. Process of claim 10 wherein the dimethyl sulfate or the methyl ester of an organic sulfonic acid comprises about 1 to 10 mol percent of the reaction mixture.

14. The process of claim 10 wherein the ammonia is in the form of an aqueous solution which contains sufficient water to dissolve essentially all the ammonium halide formed in the ammoniation.

References Cited

UNITED STATES PATENTS

| | | | |
|---|---|---|---|
| 2,878,255 | 3/1959 | Toy et al. | 260—984 X |
| 3,337,658 | 8/1967 | Senkbeil et al. | 260—989 |

CHARLES B. PARKER, Primary Examiner

A. H. SUTTO, Assistant Examiner

U.S. Cl. X.R.

260—959, 984; 424—220